Nov. 20, 1962  C. F. FORSTER ET AL  3,064,291

BRUSHING APPARATUS

Filed Oct. 30, 1961  2 Sheets-Sheet 1

INVENTOR.
CARL F FORSTER
ARTHUR P ROENSCH
BY

ATTORNEY

Nov. 20, 1962    C. F. FORSTER ET AL    3,064,291
BRUSHING APPARATUS
Filed Oct. 30, 1961    2 Sheets-Sheet 2
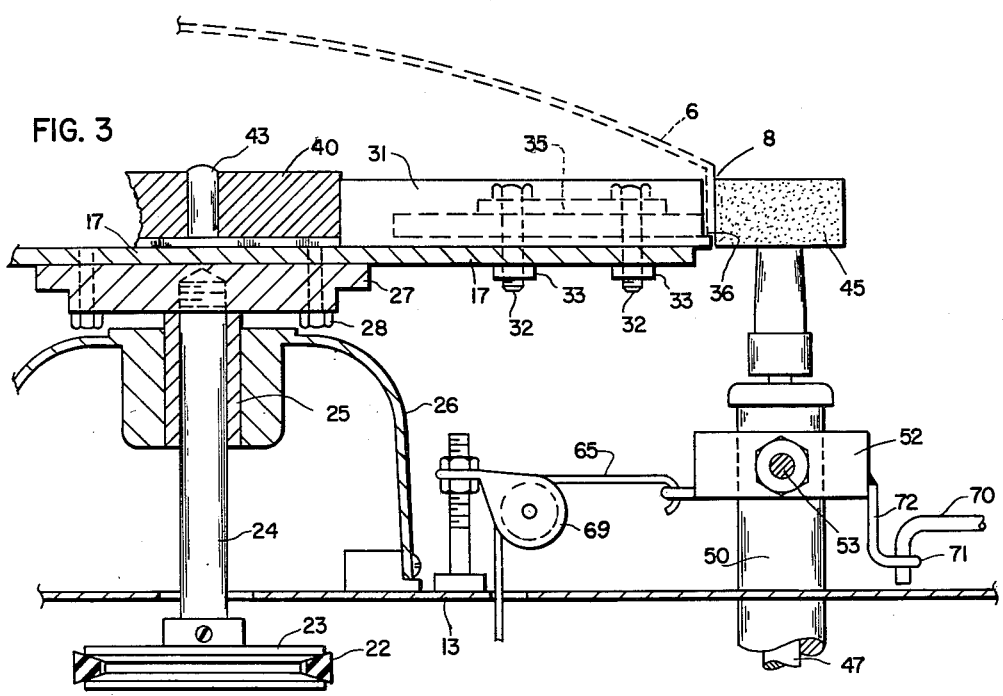
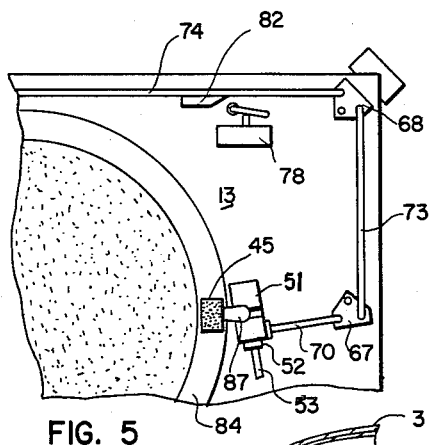
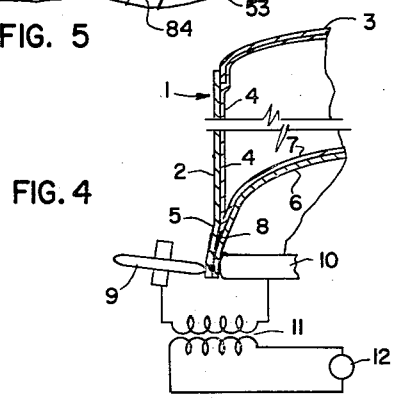
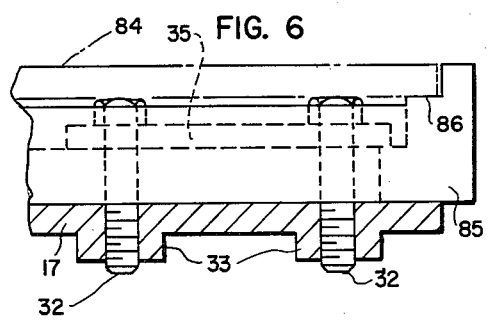
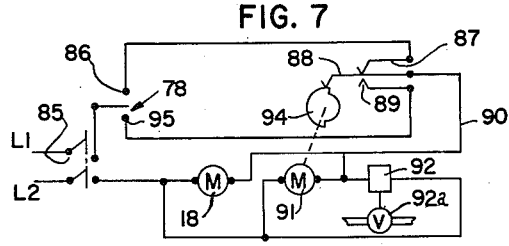
INVENTOR.
CARL F FORSTER
ARTHUR P ROENSCH
BY
ATTORNEY United States Patent Office 3,064,291
Patented Nov. 20, 1962

3,064,291
BRUSHING APPARATUS
Carl F. Forster, Milwaukee, and Arthur P. Roensch, Hartland, Wis., assignors to General Electric Company, a corporation of New York
Filed Oct. 30, 1961, Ser. No. 148,387
4 Claims. (Cl. 15—21)

This invention relates to apparatus for brush cleaning objects in preparation for other work thereon, and in particular relates to apparatus for removing unfired ceramic "bisque" from water heater tank heads to clean the same for a subsequent welding operation.

The present invention is particularly useful in the manufacture of tanks having a "glass" lining such as is currently the vogue in domestic water heaters. In the manufacture of such tanks one end closure of "head" is welded to the cylindrical body, following which the interior of the tank is sprayed with a coating of glass frit. As is known in the art, the glass frit is initially in the form of a water suspension whereupon after the water is evaporated, the frit remains on the surface as a substantially uniform dust-like coating, known in the art as "bisque." The other tank head, which is usually what is known in the art as a "minus" head because it is a domed object which telescopes into the open bottom of the tank body, is similarly sprayed with glass frit on the one of its surfaces which faces into the tank. After these elements have been fired to form the "glass" linings, the bottom head is inserted into the open end of the tank body and welded to complete the tank. The preferred weld for mass production is a seam weld made an inch or so above the bottom heads of the tanks; and it will be obvious that a satisfactory weld could not be made if the mating surfaces of the tank body and head were coated with or contained deposits of the vitrified frit.

The tank body itself has a "square" bottom edge. It is a comparatively easy matter for a workman to remove the bisque from about the lower inside wall, using a brush on a fixture guided by the bottom edge of the tank. The bottom head, however, frequently does not have a square bottom edge, for it is the practice to provide tabs or extensions to which are attached the feet or other base structure on which the completed tank will rest in service. And it is difficult, therefore, for a workman manually to brush the bisque from the necessary area of the bottom head.

It is therefore a principal object of the invention to provide mechanism to facilitate the removal of bisque from the later-welded areas of the tank head.

It is another object of the invention to provide mechanism which unskilled labor may operate efficiently and without damage to those portions of the tank head in which the ultimate glass coating must be without flaw.

It is a further object of the invention to provide a brushing mechanism which is readily adjustable to tank heads of different diameters.

It is still another object of the invention to provide a brushing mechanism which is readily adapted to brushing horizontal as well as vertical surfaces.

In a presently preferred form of our invention, we provide a supporting platform on which a turntable is mounted for rotation about a vertical axis. Said turntable is arranged to be rotated at a controlled slow rate by means of a motor equipped with suitable speed reducer mechanism. Mounted on the platform for rotation toward or away from the periphery of the turntable, we provide an independently powered brush which may be arranged for rotation about an axis which may range from vertical to horizontal, to render the brush adaptable for vertical, sloping, or flat surfaces.

The turntable is provided with means for guiding work supporting jaw members in radial movement. A feature of the invention resides in the provision of means which can be brought into registry with the work supports to position the supports for accommodating any one of a plurality of work diameters.

Means are provided whereby after a head has been positioned on the work supports, a simple manual operation which brings the brush into registry with the tank head automatically commences the rotation of the turntable and the brush. After a predetermined rotation calculated to insure that the wall of the tank head has been cleaned of bisque, the operation of the turntable and brush is automatically terminated.

Other features and advantages of the invention would best be understood by the following detailed description of a presently preferred embodiment read in connection with the accompanying drawings in which:

FIG. 3 is a fragmentary side sectional elevation taken on lines 3—3 of FIG. 1;

FIG. 4 is a fragmentary side sectional elevation of a glass-lined tank to illustrate the arrangement of parts during a welding operation;

FIG. 5 is a fragmentary plan view showing adaptability of the apparatus for flat surface brushing;

FIG. 6 is a side elevation showing a work supporting jaw for plates or other flat surfaces; and FIG. 7 is a schematic of a suitable power system and controls therefor.

Figure 1:
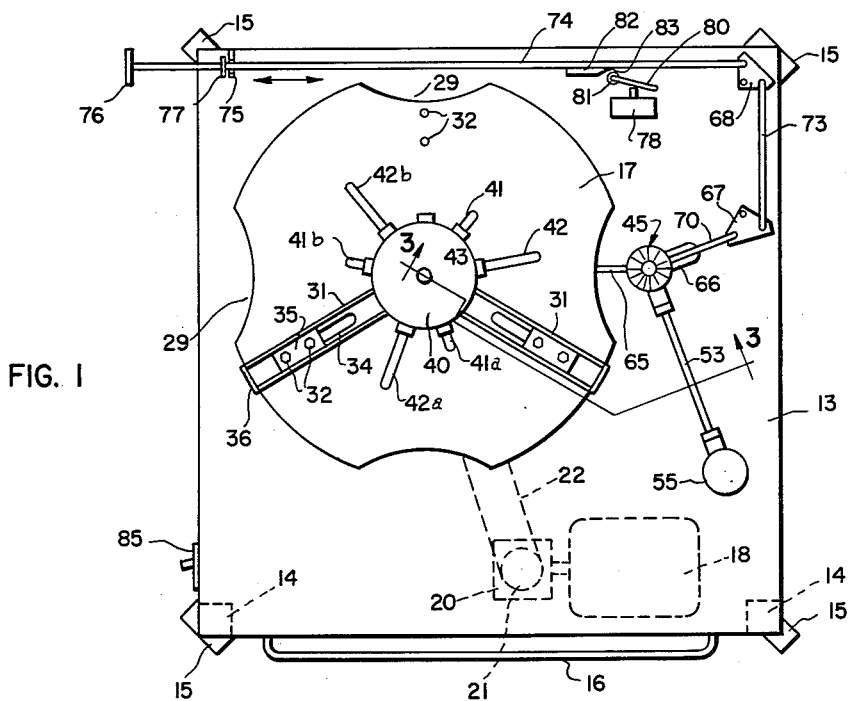
FIG. 1 is a top plan view of the apparatus with two of the three work supporting jaws at minimum radial extension and the third jaw removed to show the guiding pins.

Referring initially to FIG. 4, the water heater tank 1 is schematically shown in section in a final stage of manufacture. The cylindrical body shell 2 and top head 3 had previously been welded together and then provided with the "glass" lining 4 after welding. The lining is initially applied as a "slip" by standard spray techniques which coat the entire interior except for a band 5 about the bottom inside wall. The elimination of the dried slip about the band 5 may be by manual brushing, as previously stated. The bottom head 6 has its own glass lining 7 which coats its entire surface except for a band 8. The coating on the head 6 may also be applied by spraying, and the band 8 is cleared of any overspray or excess by brushing on apparatus later described. The head 6 and the assembled head 3 and body 2 are then run through a conventional furnace (not shown) in which the dried slip or bisque is vitrified into a dense corrosion-resistant coating. After firing, the head 6 is forced into the open bottom of the tank body 2 and seam welded to said body by conventional means including the wheel electrodes 9 and 10 supplied from the transformer 11 and the generator 12, as well understood in the art. It will be obvious that it is necessary that the portions 5 and 8 at which the weld takes place must be free of glasss or any other extraneous material which would prevent the formation of a perfect weld. It is therefore most important that the skirt portion 8 of the head 6 be clean, and that the head itself be carefully handled during the brushing stage for the bisque at that time is in the form of a dry powder which is easily damaged.

Our invention provides a mechanism whereby the head 6 can be worked on with minimum of manual handling or the likelihood of damage.

Referring now to FIG. 1, we provide structure comprising a platform 13 having suitable leg members 14 mounted on casters or the like 15. The platform 13 may be approximately 30 inches from the floor and fitted with a suitable handle 16 to permit a workman easily to move the structure to any desired point of use.

A turntable 17 is mounted for rotation on a vertical axis and is spaced a few inches above the platform at a height which facilitates the placing and removal of a tank head thereon. The turntable is driven at a controlled slow rate of speed by means including an electric motor 18 and a conventional speed reducer 20 having a driving sheave 21 accommodating a belt 22 serving a sheave 23 at the end of the turntable shaft 24, FIG. 3. The speed reducer system accomplishes rotation of the turntable at a rate of 12 r.p.m. The turntable shaft passes through the bearing assembly 25 mounted on a support spider 26 suitably fixed to the platform 13 as indicated; a flange 27 fixed to said shaft is secured to the turntable by machine screws 28. The turntable is circular, as shown, except for the arcuate cut-outs 29 which facilitate the placing and removal of the work on the turntable and also accommodate the plurality of tab-like extensions 30 (one shown fragmentarily in FIG. 2) which are located about the head to provide means for attaching leg structures or the like.

A plurality, illustratively three, of work supporting jaws 31 are arranged for guided radial adjustment on the turntable. The guiding means may conveniently comprise the studs or machine screws 32 which enter tapped bosses 33 on the underside of the turntable. The jaws 31 have an elongated slot 34 (FIG. 1) through which the screws 32 snugly pass. The jaws are channel-shaped, with the flat web of the channel (in which the slot 34 is formed) resting on the turntable. For securement of the jaws in radially adjusted position, we pass the screws 32 through a clamping plate 35 which seats snugly between the upstanding flanges of the channel. The respective jaws terminate in a work-supporting step 36 projecting forwardly of the side walls as shown.

For adapting the brushing mechanism to work on several sizes of tank heads—for example, the assignee of our invention manufactures tank heads having an outside diameter of 16, 20 and 22 inches—we provide means for quickly and accurately gauging the required radial projection of the jaws to place the steps 36 thereof to snugly accommodate a tank head.

The gauging means comprises a plate 40 and two sets of pins extending radially therefrom. The plate 40 is preferably a disc having a diameter so related to the length of the jaws 31 that when the radially innermost ends of said jaws abut the edge of the disc the jaws are accurately positioned to snugly accommodate a 16" diameter tank head. A first set of pins 41, 41a and 41b, extends from the side wall of the disc 40, there being an angle of 120° between successive pins. These pins project equally from the disc, whereby when the respective jaws are brought into contact with the distal ends of the pins of this set, the work supporting ledge 36 of each jaw is equidistant from the center of the turntable and positioned to snugly accommodate a 20-inch diameter tank head. A second set of pins 42, 42a, 42b, similarly projects from the disc, and has a length whereby when the jaws are brought into engagement with the ends thereof, the respective ledges 36 are accurately positioned for the 22-inch diameter tank head. These pins are screw-threaded into the disc 40 and fitted with conventional lock-nuts to secure the pins in accurate adjustment. The sets of pins are arranged so that they do not interfere with bringing the jaws into contact with the wall of the disc to establish the setting for minimum tank head diameter. The preferred diameter of the turntable 17 is such that the jaw ledges 36 are substantially at the periphery of the turntable when the jaws are set for the minimum diameter tank head. This arrangement insures that there will be ample clearance to accommodate the projecting tabs 30 of the tank head, and the workman may grasp a tank head about the lower edge and set it onto the ledges 36 without conflict with the turntable 17. It will be apparent that the cut-out portions 29 facilitate the installation and removal of the tank heads on the jaws.

The disc 40 is mounted on a pin 43 projecting from the axis of the turntable, and is manually rotatable thereon.

Figure 2:
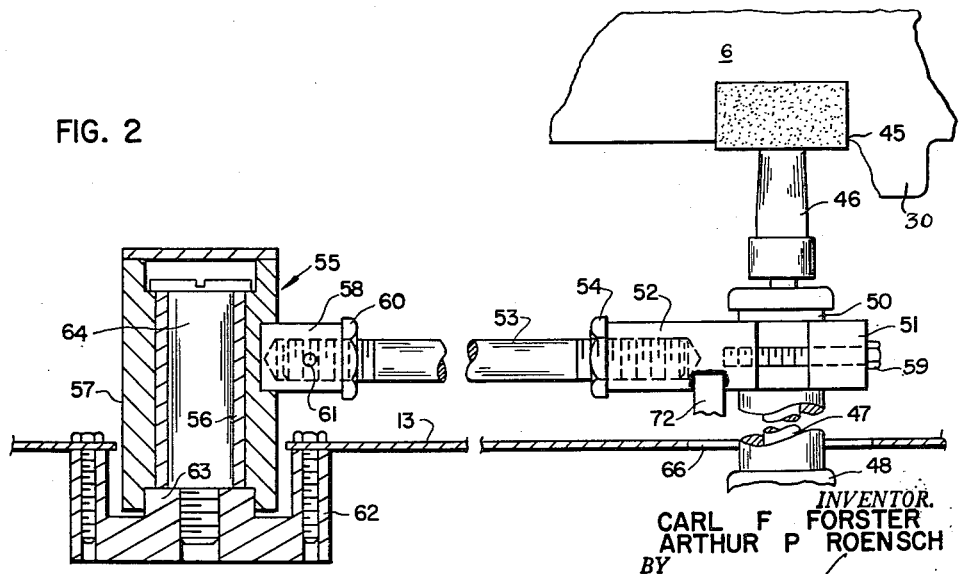
FIG. 2 is a fragmentary side sectional elevation to show the brush supporting means.

FIG. 2 details the brushing mechanism and mounting means. A wire brush 45 is mounted on a spindle 46 coupled by any conventional means to the end of a shaft 47 of a motor 48. We prefer to use an air-powered motor, for such motors are small in diameter and light in weight, and are available in a wide range of rotational speeds. In the present apparatus we operate a two-inch diameter brush at a rotational speed of the order of 2400 r.p.m. Shaft 47 is journalled in a cylindrical bearing structure 50 extending from the end of the motor 48. Said bearing structure is clamped between the opposing jaws 51 and 52, secured together by means of the screws 59, it being understood that the jaws have symmetrical V-shaped operating faces and that there is a screw on each side of the bearing 50. The bearing is several inches in length, thus providing amply for the vertical adjustment of the brush. The jaw 52 is tapped on an axis radial to the axis of the shaft 47 to accommodate the threaded end of a radius rod 53. The jaw is arranged to be rotatable about the axis of the rod 53 and secured in position by means including a locking nut 54.

The rod 53 is rotatable about a vertical axis on structure 55 comprising a sleeve bearing 56 within a cylindrical mount 57 to which the rod 53 is affixed. Specifically, the end of the rod 53 is threaded into a projecting arm 58 and held against rotation or axial displacement by conventional means such as a lock nut 60 and a pin 61. The lowermost end of the mount 57 is countersunk to provide a rim portion rotatably carried by a base 62 having an annular bearing portion 63 facing an opening in the platform 13. The base 62 is suitably affixed to the underside of the platform and is axially tapped to receive the threaded reduced end of the axle-bolt 64. To maintain brush 45 yieldably against the adjacent wall of the tank head 6 we may use a weighted cable 65 affixed at one end to the jaw 52 and passing over a pulley 69 and then downwardly through an opening in the platform as shown in FIG. 3. Any suitable weighting arrangement (not shown) may be affixed to the cable 65 to exert a leftward effort of the brush mount as viewed in FIG. 3. It will be understood that the brush bearing structure 50 extends through an arcuate slot 66 in platform 13.

To withdraw the brush from the tank head after a brushing operation we provide a bell crank system which also embodies means for automatically placing the mechanism in operation. As best shown in FIG. 1, we provide bell cranks 67 and 68 pivotally mounted on the platform 13. The leg of crank 67 is attached to jaw 52 by means of a link 70 which enters a loop 71 extending from the end of a plate 72 fixed at one end of the jaw 52. As indicated in FIG. 3, the link has moderate play within the loop to permit the brush 45 to adjust to any minor protrusions or eccentricity of the head 6. It should be noted also that the link 70 is readily removable so that a link having a length appropriate to the diameter of the tank head to be brushed may be installed as required. Cranks 67 and 68 are connected by a link 73, and to crank 68 there is attached a rod 74 passing through an upwardly open forked guideway 75. Said rod 74 terminates in the operating handle 76. When the machine is at rest the rod 74 is in its extreme left position as viewed in FIG. 1, and a bar 77 is against the guideway 75 to hold the brush 45 outside of the circle of the turntable 17.

It will be evident from FIG. 1 that by lifting on the handle 76 so that the bar 77 can clear the guideway 75, the rod 74 can be pushed to the right of the figure to move the brush 45 into engagement with a tank head positioned on the jaw ledges 36. This movement also effects the operation of a switch 78 mounted on the platform 13. Said switch may be of the well-known single pole, double throw, indexing type in which its actuating button is biased to establish the switch in its open circuit position and each depression of the button indexes the switch to one or the other of its closed circuit conditions. To operate said button in the inward direction we provide a lever 80 in overlying relation to the switch button. Said lever terminates in a wheel 81. On the rod 74 we provide a cam 82 having a sloping end 83. When the rod is urged to the right the end 33 will engage the wheel 81 to rotate the lever in a direction pushing the switch button inwardly to produce a new circuit condition of the switch and that when the rod 74 is withdrawn to the left, the disengagement of the cam from wheel 81 will cause the switch to restore to open position.

FIGS. 5 and 6 show an adaptation for brushing non-vertical surfaces such as a flat plate 84. Jaw members 85 are similar to the jaws 31 in being channel-like devices adjustably secured to the turntable 17 as previously described, but instead of a work supporting ledge these jaws are provided with a step 86, on which the edge of the plate 84 rests. The brush 45 is mounted on a conventional angle drive head 87. With the axis of the motor shaft 47 in a vertical position the brush would rotate in a vertical plane; by adjusting the arm 53 to a desired degree of axial rotation, the plane of rotation of the brush may be adjusted to suit the slope of the surface which is to be brushed.

The operation of our invention will best be understood from a consideration of FIGS. 3 and 7. The operator receives a tank head from the spray line (not shown) when the coating is in its dusty "bisque" condition. The operator handles the tank head only about the bottom edges thereof and places it on the supporting jaws. Of course, the jaws have been set for the size of tank heads in production, and the appropriate link 70 is installed.

After placing the tank head on the turntable and closing the main power switch 85, the operator lifts on handle 76 to disengage the bar 77 from the forked guide 75 and pushes inwardly on the rod 74, whereupon cam 82 operates switch 78 from its open position to close with contact 86. The power circuit is then completed from L1, contact 86, timer operated cam contacts 87 and 88, conductor 90 to main motor 18, timer motor 91, and valve solenoid 92 to power line L2. This begins the brushing operation, for the turntable 17 is being rotated by the motor 18 and the valve solenoid has opened the valve 92a to admit air from a suitable compressed air source (not shown) to the brush motor 48. The timer cam 94 is geared or otherwise arranged to rotate one-half revolution during one and one-quarter revolutions of the turntable. At this time the cam follower 88 drops to the lower cam level, opening the power circuit at 87 to halt the operation of the motor 18 and brush motor 48 (by shutting off its air supply) and closing with the lower contact 89 to prepare an energizing circuit for the next operation. The operator draws out on rod 74, relatching it behind fork 75. As cam 82 releases the switch button, the switch indexes to an open position. To commence the next operation the rod 74 is again movd to the right of FIG. 1 whereupon the cam 82 indexes the switch to the lower contact 95 to complete the obvious power circuit. The next one-half revolution of the timer cam 94 which signals a one and one-quarter revolution of the turntable 17, restores the cam follower to the upper level of the cam, breaking the power circuit at 89 to stop the operation and closing against cam switch contact 87 to prepare for the next operation.

While there has been described what is at present thought to be the preferred embodiment of our invention, it will be understood that various modifications may be made therein and it is intended to cover in the appended claims all such modifications as fall within the true spirit and scope of the invention.

What is claimed is:

1. Apparatus for brushing the side wall of a cylindrical object, comprising structure providing a platform, a table mounted for rotation relative thereto, means on said table providing guiding means extending radially therefrom, jaw members slidably mounted on each said guiding means, said jaw members having means at their radially outermost ends to support the object for brushing, a setting device mounted at the axis of rotation of said table, said device including a disc having radially extending therefrom two sets of pins, the pins of each set having an equal radial extension from said disc, but each set being of different radial extension, said pins each being arranged on said disc to be selectively brought into engagement with the inner end of said jaw members and so arranged that said jaw members may optionally be brought into engagement with the periphery of said disc whereby to provide three radial adjustments of said jaw members to accommodate any of three diameters of cylindrical objects, means for locking said jaw members in adjusted position, brushing means, a swing arm for mounting said brushing means, said swing arm being mounted on said platform for rotation on an axis eccentric to said table, means for moving said brushing means into yieldable engagement with said cylindrical object, means for rotating said table and said brushing means, means for interrupting rotation of said table after a predetermined extent of revolution thereof, and means for withdrawing said brushing means from said object.

2. Apparatus for brushing the side wall of a cylindrical object, comprising structure providing a platform, a substantially circular table mounted on said platform for rotation about a vertical axis, means on said table providing guiding means disposed radially thereon, jaw members slidably mounted on each said guiding means, said jaw members having a ledge structure at their radially outermost ends to receive the object for brushing, a setting device mounted at the axis of rotation of said table, said device including a plate having radially extending therefrom two sets of pins, the pins of each set having an equal radial extension from said plate, but each set being of different radial extension, said pins each being arranged on said plate to be selectively brought into engagement with the inner end of said jaw members and so arranged that said jaw members may optionally be brought into engagement with the periphery of said plate whereby to provide three radial adjustments of said jaw members to accommodate any of three diameters of cylindrical objects, means for locking said jaw members in adjusted position, brushing means, a swing arm for mounting said brushing means, said swing arm being mounted on said platform for rotation on an axis eccentric to said table, means for rotating said swing arm about an axis parallel to said platform, means for moving said brushing means into yieldable engagement with said cylindrical object, means for rotating said table and said brushing means, means related to the rotation of said table for interrupting rotation of said table and said brushing means after a predetermined revolution of said table, and means for withdrawing said brushing means from said object.

3. Apparatus for brushing the side wall of a cylindrical object, comprising structure providing a platform, a substantially circular table mounted thereon for rotation about a vertical axis, a plurality of jaw members slidably mounted on said table for guided radial movement, each of said jaw members having a ledge structure at its radially outermost end to receive the object for brushing, a setting device mounted at the axis of rotation of said table, said device including a disc freely rotatable on said table and having radially extending from the periphery of said disc two sets of pins, the pins of each set having an equal radial extension from said disc, but each set being of different radial extension, said pins each being arranged on said disc to be selectively brought into engagement with the inner end of said jaw members and so arranged that said jaw members may optionally be brought into engagement with the periphery of said disc whereby to provide three radial adjustments of said jaw members to accommodate any of three diameters of cylindrical objects, means for locking said jaw members in adjusted position, brushing means having a driving motor, a swing arm for mounting said brushing means and said motor, said swing arm being mounted on said platform for rotation on an axis eccentric to said table and for rotation about the axis of said arm, means for securing said swing arm to establish a desired plane of rotation of said brush, motor means for rotating said table at a controlled rate, switch means for interrupting rotation of said table and said brush means, cam means related to the rotation of said table to open said switch means after one and a fraction revolutions of said table and to prepare a circuit for a succeeding work operation, means including a lever system for moving said brush into or out of operating position relative to said object, and means effective upon operating said lever system to place said brush in operating position, to complete the circuit for said succeeding work operation.

4. Mechanism for brushing circumferential areas of a workpiece, comprising a support structure, a turntable mounted for rotation thereon, a plurality of chucking jaws arranged radially on said turntable, each of said jaws having a ledge structure at its radially outermost end to provide a support for said workpiece, means for guiding said jaws for radial movement on said turntable, jaw adjustment means comprising a disc having first and second groups of equidistantly extending pins in which the extent of projection of the first group is greater than that of the second group, means for rotatably mounting said disc at the axis of rotation of said turntable, the number of pins in each group corresponding to the number and radial disposition of said jaws whereby the pins may be selectively brought into registry with said jaws to selectively gauge the radial projection of the ledge portions thereof, means for securing said jaws in said gauged position, a rotatable brush, means for causing said brush yieldably to engage a surface of said workpiece, means for rotating said turntable at a controlled rate, and means for rotating said brush.

No references cited.